United States Patent
Higurashi et al.

[11] Patent Number: 6,052,246
[45] Date of Patent: *Apr. 18, 2000

[54] METHOD AND APPARATUS FOR RECORDING DIGITAL SIGNALS IN THE FORM OF PRIMARY DATA PLUS AUXILIARY INFORMATION

[75] Inventors: Seiji Higurashi, Fuchu; Yoichi Zenno, Tokyo, both of Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/882,284

[22] Filed: Jun. 25, 1997

[30] Foreign Application Priority Data

Jun. 27, 1996 [JP] Japan ................................ 8-167111

[51] Int. Cl.[7] .............................. G11B 5/09; H04N 9/79; H04N 5/91; H04N 5/926
[52] U.S. Cl. ................................. 360/48; 386/40; 386/95; 386/124
[58] Field of Search ................................ 360/48; 386/40, 386/124, 95, 125, 126, 45

[56] References Cited

FOREIGN PATENT DOCUMENTS

| | | |
|---|---|---|
| 0 274 382 | 7/1988 | European Pat. Off. . |
| 0 325 325 | 7/1989 | European Pat. Off. . |
| 0 373 895 | 6/1990 | European Pat. Off. . |
| 0 624 876 | 11/1994 | European Pat. Off. . |
| 0 639 927 | 2/1995 | European Pat. Off. . |
| 646 922 | 4/1995 | European Pat. Off. . |

*Primary Examiner*—W. R. Young
*Assistant Examiner*—Regina Y. Neal
*Attorney, Agent, or Firm*—Michael N. Meller; Eugene Lieberstein

[57] ABSTRACT

Additional information of multi-programs can be recorded using a source pack which indicates channel numbers and the like in multi-channel or single-channel recording. An additional flag AF in this pack indicates whether the pack is auxiliary information which is constructed with a plurality of pack groups or auxiliary information which is constructed with a single pack. If AF is 0 and the total pack number (T.P. No.) is 0, the pack is a source pack of a single channel. If AF is 0 and T.P. No. is n ($\neq 0$), the T.P. No. is defined to indicate the source pack number. Also, if AF is 1 and T.P. No. is 0, the pack is the last pack; if AF is 1 and T.P. No. is n ($\neq 0$), the T.P. No. indicates the total number of packs appended to the pack.

14 Claims, 7 Drawing Sheets

METHOD AND APPARATUS FOR RECORDING DIGITAL SIGNALS IN THE FORM OF PRIMARY DATA PLUS AUXILIARY INFORMATION

BACKGROUND OF THE INVENTION

This invention relates to digital signal recording method and recording media. More specifically, the present invention relates to a digital signal recording method to record the main data which is the primary data together with additional or auxiliary information and the recording media on which the data are recorded.

Generally, in a digital signal recording method for recording digital signals on a recording medium, digital signals are chronologically combined or synthesized on a data block basis and recorded on each of the tracks of the recording medium. It is also a common practice that digital signals of additional or auxiliary information, such as a time code or the time and date of the recording or even source information, be recorded on a region of a track isolated from the region where the main data, the primary information, is recorded.

Recently, there are increasing numbers of source data such as digital television broadcasts and also there are a number of signals containing additional or auxiliary information, besides those mentioned above, such as a cassette ID which identifies a cassette tape, a program index number, a television channel number, a title, or information about each program.

When recording the main data, consisting of a plurality of programs to record, all of these data in the uniform format of a conventional technique must be recorded within a predetermined region by specifying the recording position for each program and the like in advance. This limits the number of available programs which are determined by the format specification. Also, when recording fewer programs than those that are predetermined, different data cannot be recorded within the remaining, unused areas. This is not a cost-effective use of a recording medium. In addition, there is another problem in that the bits allocated to a limited region may be insufficient to record a large variety and amount of auxiliary information.

SUMMARY OF THE INVENTION

It is an object of the present invention to overcome the above problems and to provide a method of recording digital signals in which signals are recorded in a unified format on a recording medium on which digital signals are recorded using the recording method.

In order to fulfill the above object, the recording method of the present invention is directed to a method of recording digital signals on a recording medium. The method includes the steps of recording main data on the recording medium on a data block basis, the data block having a preselected length. Auxiliary information is recorded on the recording medium on a data pack basis, the data pack having a length shorter than said preselected length of said data block. Finally, recorded as source packs and multiplexed with the auxiliary information are a fixed pattern indicating the type of data packs and a flag indicating whether the auxiliary information comprises a plurality of pack groups or a single pack.

The flag is used to check if additional information is recorded in a plurality of packs or in a single pack, and the number of packs is used to identify how many packs are recorded.

Also, the recording method incorporating the principles of the present invention can include a fixed pattern which indicates the type of pack, a flag which indicates whether or not the auxiliary information comprises a plurality of pack groups or a single pack, and the number of packs associated with the flag value indicates the number of packs appended to the packs or the number which indicates the location in which the auxiliary information is multiplexed. The pattern, flag, and number are recorded as source packs which are multiplexed with the auxiliary information.

With the method incorporating the principles of the present invention, the aforementioned flag and number can permit a reader to identify which mode is used in recording—a single-channel or multi-channels.

In a further object of the present invention, in the recording method, the data packs record information packs containing only a fixed pattern and auxiliary information without the flag and number. Also, auxiliary information, which excludes channel numbers, such as program information, a title, and the like can be recorded.

It is yet another object of the recording method of the present invention to use the flag and its number of the source packs to identify the last pack of a pack group with which said source packs are multiplexed. With the method of the present invention, even if packs in the pack group are damaged and the number of added packs is unknown, the end of the packs is still positively identified.

Moreover, in the recording method of the present invention, a flag and number of the source packs identify the location in which the packs are multiplexed with the pack group. With this arrangement, important packs can be duplicated to be recorded a plurality of times.

Also, in the recording method of the present invention, a flag and its number is used to identify the number of information packs which are multiplexed and appended to the aforementioned source pack. In this way, a reader can identify and read the information packs in a positive manner.

In the recording method incorporating the principles of the present invention, the main data are recorded on a data block basis and auxiliary information is recorded on a recording media on the basis of a data pack whose length is shorter than that of the data block. A fixed pattern indicating the type of the pack, a text code of the text data pack which packs the text data of auxiliary information, and a number which indicates the number of text data packs appended to the packs are all recorded as a text header which is multiplexed with the auxiliary information.

In accordance with the principles of the present invention, text data can be recorded on a pack basis using text data packs appended to the aforementioned text header. Also, when the auxiliary information of the text header is a specific value, the text header indicates that the text data packs before and after the text header have an identical program number. In this way, any number of text data packs can be recorded in multiple channels.

Furthermore, a recording medium incorporating the principles of the present invention is one on which the main data are recorded on a data block basis and auxiliary information is recorded on the basis of a data pack whose length is shorter than that of said data block. The aforementioned source packs, information packs, or text header or text data packs are also recorded on the recording medium. This allows auxiliary information to be recorded so that a reader can clearly identify a single-channel recording or a multi-channel recording and the channel number which is recorded. Text data can also be recorded on a pack basis on the recording medium.

BRIEF DESCRIPTION OF THE DRAWINGS

The above and other objects, features, and advantages of the present invention will become more apparent from the following detailed description, in which.

DESCRIPTION OF THE PREFERRED EMBODIMENTS

The embodiments of the present invention are described herein referring to the drawings. In these embodiments, a rotary head reads/writes digital signals in the same configuration as does the helical scanning VTR on each of the tracks of a magnetic tape. These digital signals comprise the main data, which is the primary information, and the additional or auxiliary information, called "pack (data)." A pack is a data of a fixed length containing additional or auxiliary information such as a cassette ID, a time code, the time and date of recording, source data (e.g., a channel number or program index in case digital broadcast signals are recorded), text data (e.g., a title or information for each of the programs, etc.), or information regarding their identification.

Packs recorded in the embodiments incorporating the principles of the present invention have a fixed length of 6 bytes. Generally, these are a single pack for single use and an additional pack for the group use in which a group of packs are used. A single pack includes for example a cassette ID, a time code, and a source pack for single-channel recording. Additional packs are classified into those led by a source pack and those led by a text header.

In addition, the packs in which a group of additional source packs are used include a group of additional source packs for multi-channel recording and a group of additional information packs for indication of multi-channel recording. Moreover, these packs which are grouped by a text header include both a single text and plurality of text groups.

The aforementioned packs are recorded on each of the tracks of a magnetic tape together with the main data or subcoded data. Each of the tracks are constructed with so-called "sync blocks" of a predetermined size of data area, which is equivalent to the aforementioned data blocks. The data blocks are arranged such that they can be scanned by a rotary head.

Figure 2:
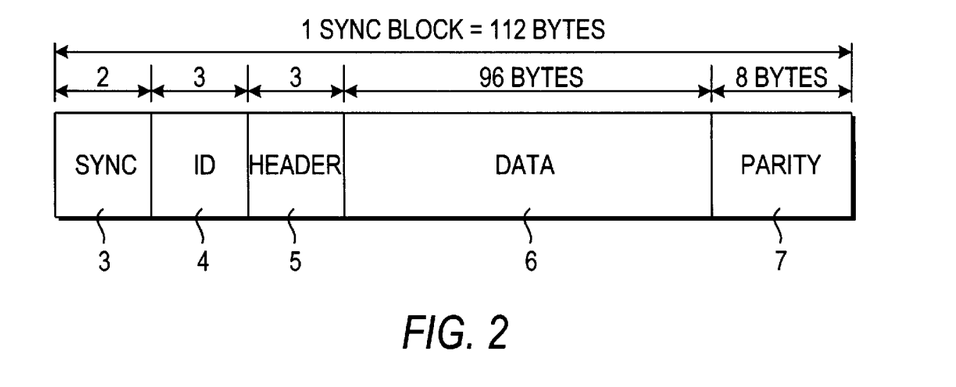
FIG. 2 is a diagram showing an example of a format by which data blocks are recorded in the method incorporating the principles of the present invention.

FIG. 2 shows an example of the sync block format. As shown in the figure, a sync block is chronologically arranged data areas of a total of 112 bytes: a region 3 of two bytes used for reading the sync block, an address data (ID) region 4 of three bytes, a header storage region 5 of three bytes used for storing a variety of data, an actual data storage area 6 of 96 bytes, and a parity region 7 of eight bytes for parity correction in the sync block.

Figure 3:
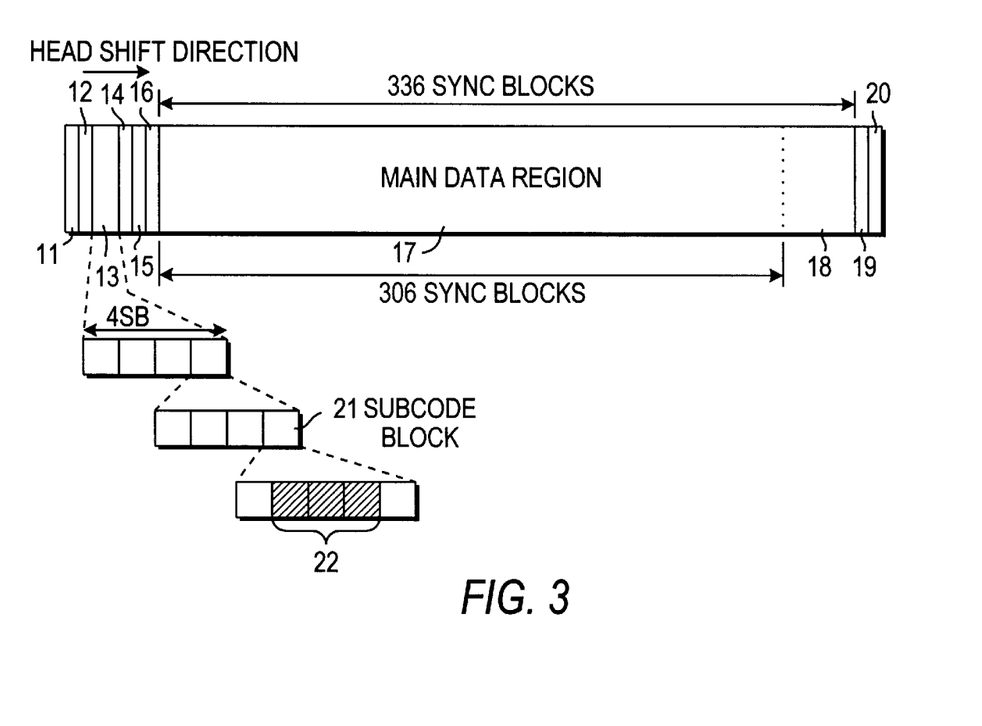
FIG. 3 is a diagram showing an example of a track format used in the first embodiment of the present invention.

FIG. 3 shows a track format used in a first embodiment of the apparatus incorporating the principles of the present invention. As shown in the figure a track is constructed with a margin region 11, a pre-amble region 12, a subcode region 13, a post-amble region 14, an 1BG region 15, a pre-amble region 16, a main data region 17, a parity correction code region 18, a post-amble region 19, and a margin region 20; this consists of a total of 356 sync blocks.

Regarding the main data region 17 and the parity region 18, the main data region 17 can be set, for example, to 306 sync blocks, multiples of six sync blocks. Also, the parity region 18 is the region where the external code (C2 code) for parity is recorded. This is made up of a total of 30 sync blocks.

The subcode region 13 comprises four sync blocks (equal to 448 bytes). Each of the sync blocks comprises four subcode blocks 21 of 28 bytes. Each of the subcode blocks 21 comprise three packs 22. Therefore, there are 48 packs (equal to 4×4×3 packs) recorded in the entire subcode region 13.

On the other hand, among the 306 sync blocks which constitute the main data region 17, by allocating one byte each of the aforementioned header storage region to one byte's worth of the pack, six bytes can be collected from six sync blocks to be assigned to a pack for recording. Therefore, the main data region 17 can record 51 (equal to 306 divided by 6) packs. In this way, a total of 99 (equal to 48 plus 51) packs can be recorded on the entire track.

Figure 1:
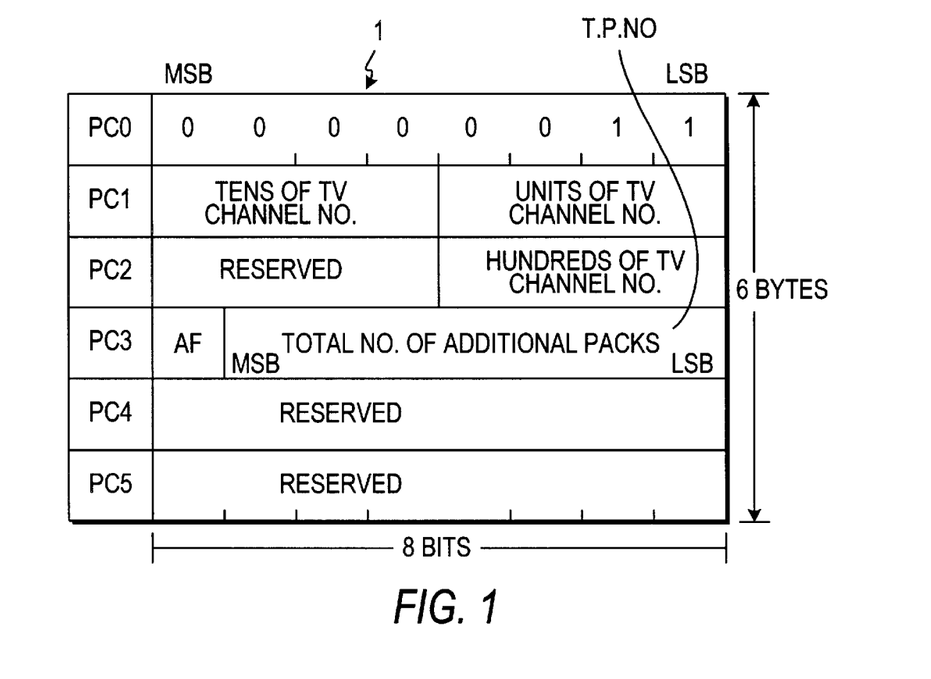
FIG. 1 is a diagram showing a source pack format of a first embodiment of the present invention.

FIG. 1 shows the source pack format defined in the first embodiment of the apparatus incorporating the principles of the present invention. As shown in the figure, six bytes are assigned to be a source pack 1. The first byte, PC0, is assigned to provide a unique pattern which indicates that these six bytes are assigned to be a source pack. The higher four bits of the second byte, PC1, are assigned to be tens of a television channel and the lower four bytes are assigned to be units of the television channel. The binary coded decimal (BCD) is the unit used for both. The higher four bits of the third byte, PC2, are assigned to be a reserved region; the lower four bits are assigned to be hundreds of the television channel in the unit, BCD.

The most significant bit (MSB) of the fourth byte, PC3, is assigned to be an additional flag (AF) described later. The second bit through the eighth bit (least significant bit designated as LSB) are assigned to the total number (T.P. No.) of additional packs. Note that the fifth byte, PC4, and the sixth byte, PC5, are reserved regions.

When the additional flag AF of one bit in FIG. 1 is 0, there is no additional information pack. When AF is 1, there is an additional information pack or an additional source pack. When the T.P. No., the total number of additional packs, is 0 and the additional flag AF is 0, the pack is a source pack of a single channel. When the T.P. No. is n (≠0), it indicates the additional source pack number. In other words, the T.P. No. shows the number of additional source packs counted from the first source pack.

If the T.P. No. is 0 when the additional flag AF is 1, the present additional information pack is the final pack. If the T.P. No. is n (≠0), it indicates the number of additional information packs or additional source packs which are appended to the present pack. Note that packs having the same contents are counted as one regardless of duplication.

Next, a specific use of the aforementioned source pack is described. In digital broadcasts, data contained in a plurality of channels are time division interpolated for multiplexing to be transmitted over the same bandwidth.

Figure 4:
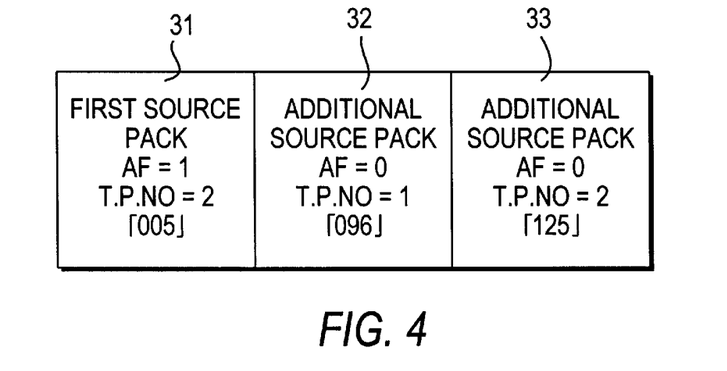
FIG. 4 is a diagram showing a group of source packs in multi-channel recording of the first embodiment of the present invention.

FIG. 4 shows an example of a group of packs which exist in these channels to indicate the recorded channels. An example of multi-channel on channels 005, 096, and 125 of digital broadcast signals are shown in FIG. 4. A group of source packs are constructed with the aforementioned additional packs during multi-channel recording. In other words, a group of source packs 31, 32, and 33, as represented in FIG. 4, indicates additional information called "digital broadcasting signal channels."

In FIG. 4, the first pack 31 is the first source pack of the source pack group, therefore the additional flag AF is 1. In this example, the pack is constructed with three channels of source packs having two appending additional source packs 32 and 33. Therefore, the T.P. No., the total number of packs is 2. Also, the channel number 005 is indicated at PC1 and PC2.

The appending second source pack 32 is the first appended additional source pack to the first source pack 31. Therefore, the additional flag AF is 0 and the T.P. No., the total number is 1. The channel number 096 is indicated at PC1 and PC2. In the same manner, the third source pack 33 is the second appended additional source pack. Therefore, the additional flag AF is 0 and the T.P. No., the total number is 2. The channel number 125 is indicated at PC1 and PC2.

As described, if the additional flag AF of a source pack is 1 and the T.P. No. is not 0, the packs are the source pack group for multi-channel recording. If both the additional flag AF of a source pack and the T.P. No. is 0, the packs are the source packs used for a single-channel recording, clearly indicating the mode of recording, single or multi-channel. It is always clear on which channel data are recorded, channel 1 or 2, or even on both channels.

Regarding important additional information, the same contents can be recorded a plurality of times to improve reliability. In the example shown in FIG. 4, each of the additional source packs 32 and 33 can be recorded a plurality of times. The locations at which each of the additional source packs which are multiplexed within the pack group are identified by T.P. Nos. of the source packs 32 and 33. In this case, the additional flag AF and T.P. No. for each of the source packs 31, 32, and 33 are the same as those of the source packs 31, 32, and 33 in FIG. 4.

Packs other than additional source packs such as a time code can exist between the additional source packs 32 and 33.

Figure 5:
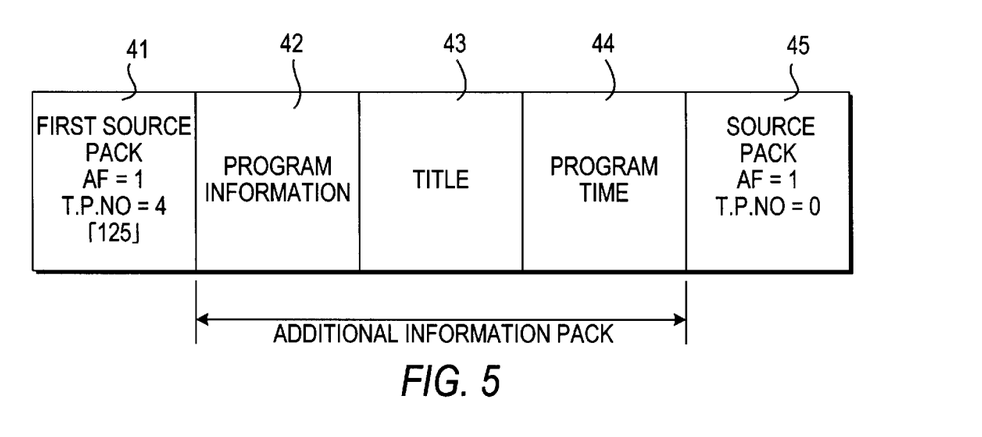
FIG. 5 is a diagram showing a group of additional information packs in multi-channel recording of the first embodiment of the present invention.

FIG. 5 shows the configuration of an information pack for indicating multi-channel recording. When recording three types of information (referred to as program information, a title, and a program time), the additional flag AF of the first source pack 41, as shown in FIG. 5, is 1, T.P. No., the total number, is 4; the channel number 125 is indicated at PC1 and PC2.

By knowing AF equals 1 and T.P. No. equals 4 of the source pack 41 it can be seen that there are four packs (four types of contents) appended to the source pack. Among the four appended packs, excluding the last pack, are additional information packs. In other words, three additional information packs 42, 43, and 44 follow immediately after the source pack 41, and the source pack 45 is recorded to indicate the end of the pack.

Each of the three additional information packs 42, 43, and 44, which indicate program information, a title, and program time codes of channel 125 which are specified by the source pack 41, are formatted on a 6-byte basis, wherein this format is different from that of the aforementioned additional source packs.

Figure 6:
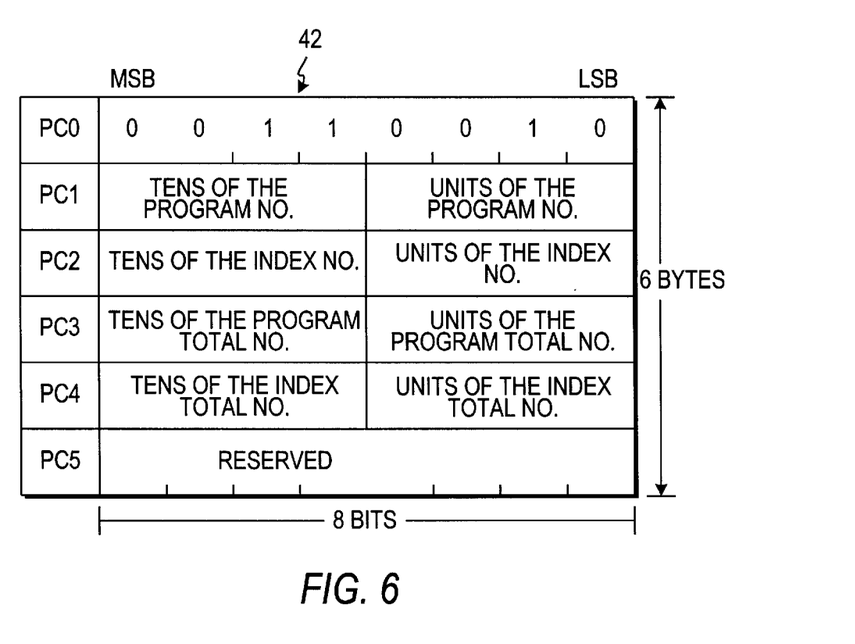
FIG. 6 is a diagram showing a format for a program information pack of the first embodiment of the present invention.

For example, the program information pack 42 is formatted as shown in FIG. 6. The program information pack 42 is constructed on a 6-byte basis, and the first byte, PC0, is assigned to provide a unique pattern which indicates that these six bytes are assigned to be a program information pack. The higher four bits of the second byte, PC1, are assigned to tens of the program number and the lower four bits are assigned to units of the program number. BCD is the unit used for both. The higher four bits and the lower four bits of the third byte, PC2, are respectively assigned to tens and units of the index number in the unit, BCD.

The higher four bits and the lower four bits of the fourth byte, PC3, are respectively assigned to tens and units of the program total number in the unit, BCD. The higher four bits and the lower four bits of the fifth byte, PC4, are respectively assigned to tens and units of the index total number in the unit, BCD. Note that the sixth byte, PC5, is assigned to be a reserved region.

None of the additional information packs such as the program information pack 42 have the T.P. No., the total number, which the additional flag AF and the additional pack have in FIG. 1. In the last pack 45 in FIG. 5, the additional flag AF is 1 and the T.P. No. is 0, indicating that this is the last pack, as described. With the source pack 45, the end of additional information packs are positively recognized even if the previous additional information packs are damaged and the number of added packs is not known.

When reading, the fact that the additional flag AF of the pack 41 is 1 and the T.P. No. is 4 indicates that the channel-related information is recorded in a series of four appended packs. The present channel related information can correspond to the sequentially recorded information if being read sequentially. In this way, not only the channel information but also the contents recorded on each of the channels can be clearly recognized by a reader.

Figure 7:
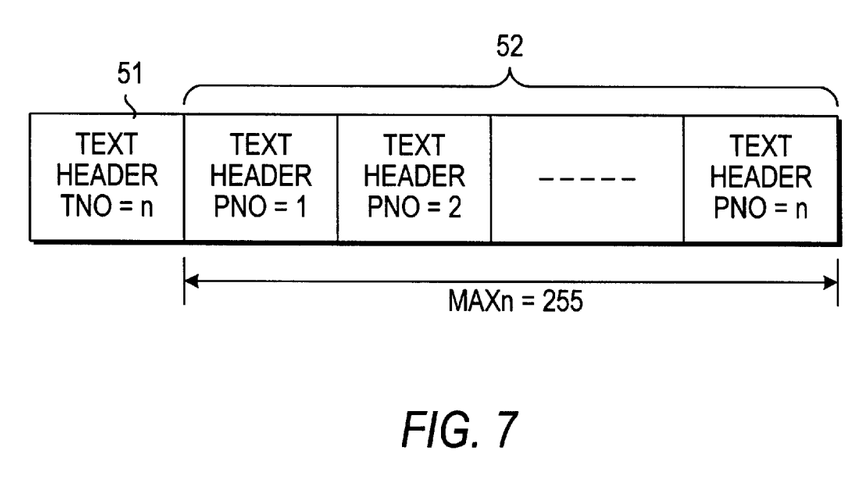
FIG. 7 is a diagram showing a format for a single text of the first embodiment of the present invention.

Next, the data recording method using a text header is described. A text comprises a text header and text data and there are two types of texts, the stand-alone text and a plurality of text groups. In a stand-alone text, as shown in FIG. 7, a text header 51 is arranged first, then a text data pack group 52 in which text data packs of n are chronologically combined is arranged where n equals 255 at maximum. The text header 51 has TNO, the total number of text data, and each of the text data packs have PNO, a pack page number as described herein. TNO, the total number of text data of appended text data packs, and PNO, the pack page number indicates the number of text data packs that exist after the text header 51.

Note that different types of packs can exist between text data packs of n constituting the above text data pack group 52. Also, text data packs of identical pack numbers can exist.

Figure 8:
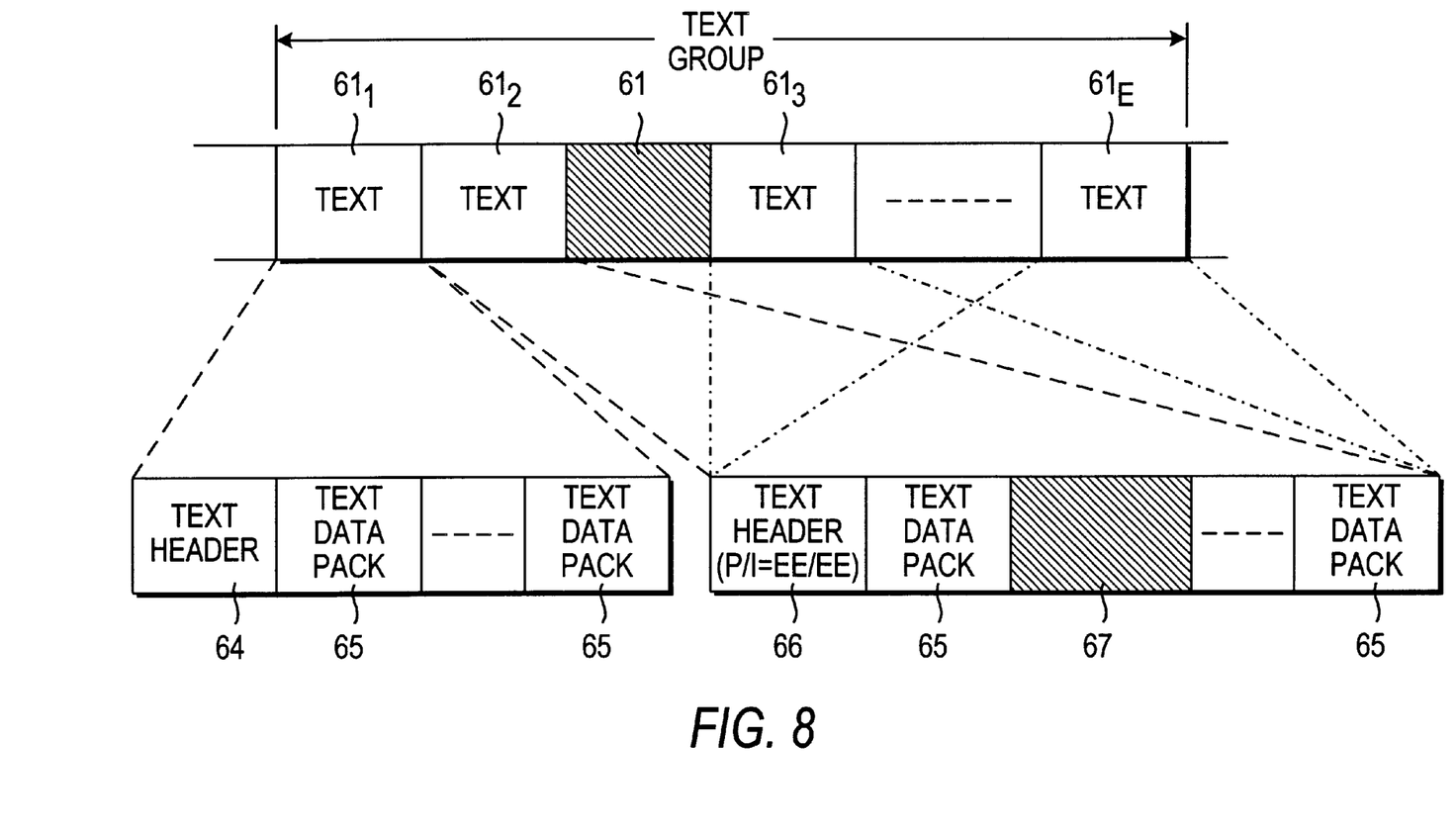
FIG. 8 is a diagram showing a format for a plurality of text groups of the first embodiment of the present invention.

On the other hand, in a plurality of text groups, as shown in FIG. 8, a plurality of texts $61_1$ to $61_E$ are chronologically combined, where a different pack 62 is inserted between the second text $61_2$ and the third text $61_3$. In text $61_1$, a plurality of text data packs 65 are chronologically combined with a text header 64. In other texts 61$_2$ to 61$_E$, a different pack 67 exists (without this pack, there is no problem of course) between a plurality of text data packs 65. A plurality of text data packs 65 are chronologically combined with the text header 66.

That is, a plurality of texts 61$_1$ to 61$_E$ are configured in the same way as the stand-alone text as shown in FIG. 7. Note that the program number and the index number to be described later are set for each of the text headers 66 of the texts 61$_2$ to 61$_E$ after the second text to be a predetermined value (e.g., each of them are EE in hexadecimal notation). This indicates that a plurality of text data packs 65 appended to the text header 66 share the identical program number and the identical index number as that of the text 61$_1$, which exists before the text header 66. With this configuration, the text data with the identical program number and identical index number can be read/written from the text group which is comprised of a plurality of texts 61$_1$ to 61$_E$.

Figure 9:
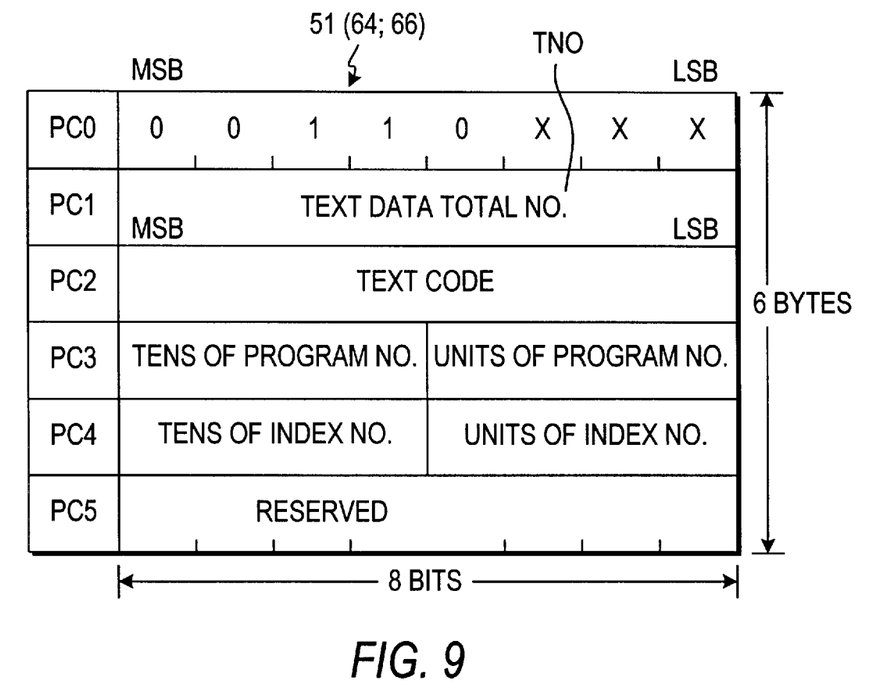
FIG. 9 is a diagram showing a format for a text header of the first embodiment of the present invention.

The text headers 51, 64, 66 are constructed on a 6-byte basis as shown in FIG. 9. The higher five bits of the first byte, PC0, are assigned to provide a unique pattern which indicates that these six bytes are assigned to be the text header. The lower three bits of the first byte, PC0, are assigned to a variable which is set based on whether the content of the text is, for example, a title or a caption. Also, the second byte, PC1, is assigned to TNO, the total number (maximum equals 255) which indicates the total number of the text data appended to the header. The third byte, PC2, is assigned to be a text code.

Moreover, the higher four bits and the lower four bits of the fourth byte, PC3, are respectively assigned to tens and units of a program number in BCD. The higher four bits and the lower four bits of the fifth byte, PC4, are respectively assigned to tens and units of an index number in BCD. The sixth byte, PC5, is assigned to be a reserved region. The maximum value for each of the program number and the index number is 99 and the minimum value is 0.

As described, the program number and the index number of EE in hexadecimal notation means that they are identical with those of the previous text. When text packs of 255 or more are required, text packs can be added to reach the number indicated as T.P. No.

Figure 10:
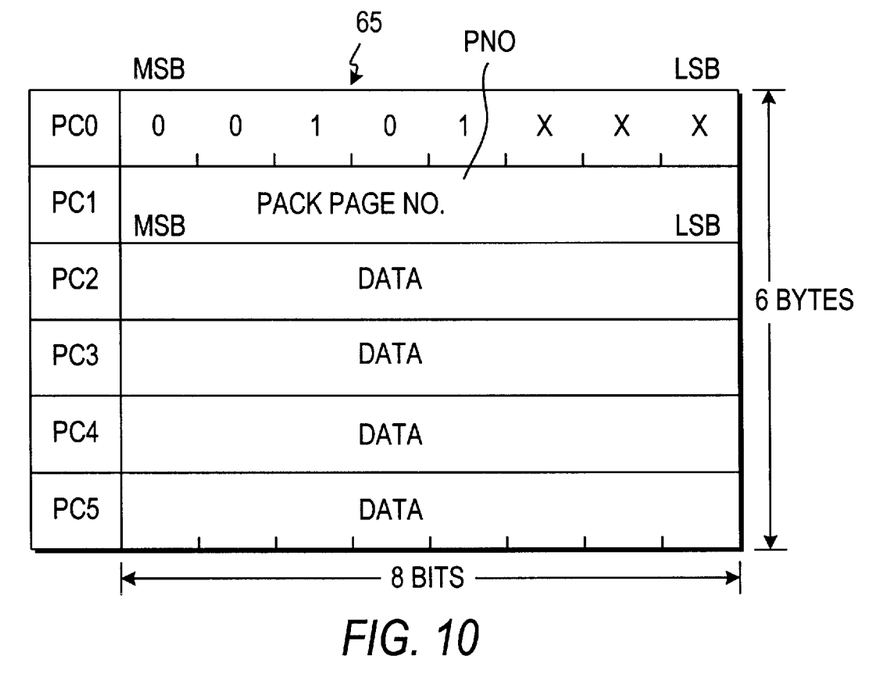
FIG. 10 is a diagram showing a format for a text data pack of the first embodiment of the present invention.

In addition, the text data pack 65 is constructed on a 6-byte basis as shown in FIG. 10. The higher 5 bits of the first byte, PC0, are assigned to provide a unique pattern which indicates that these six bytes are assigned to be text data. The lower three bits of the first byte, PC0, are assigned to a variable which is set based on whether the content of the text is, for example, a title or caption. Also, the second byte, PC1, is assigned to the pack page number which indicates the number of text data appended to the text header. Four bits of the third byte, PC2, through the sixth byte, PC5, are assigned to text data. This text data includes font data and graphic data besides text data.

In this way, additional packs allow processing data of more than 6 bytes as a pack data even if a pack is constructed on a 6-byte basis.

Figure 11:
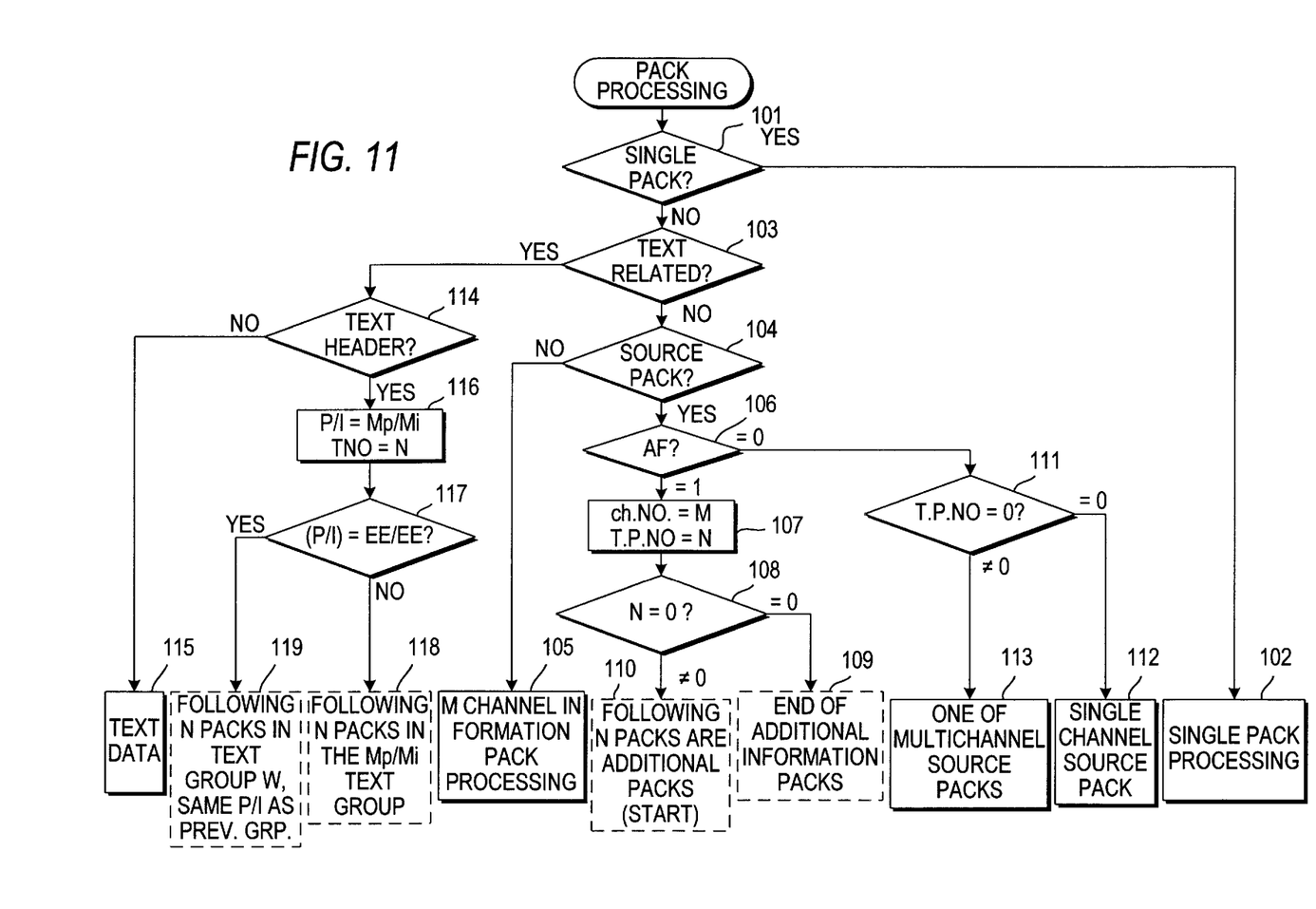
FIG. 11 is a flowchart describing pack reproduction processing in the first embodiment of the present invention.

Next, the processing of the aforementioned packs read from the recording media on which the packs are recorded is described referring to FIG. 11. To begin the pack processing, whether the pack input is a single pack or not is checked referring to the PC0 value (step 101). The single pack is a pack containing the cassette ID, the time code, etc., and is also an additional information pack which can be transmitted on a 6-byte length basis. Note that the source pack in the single channel which is to be described later is also a single pack; however, it is identified not to be a single pack at this time.

If the pack input is a single pack, contents of the single pack data are processed (step 102). If it is not, whether the pack is text-related or not is determined based on the PC0 value (step 103). If it is not a text-related pack, whether or not the pack is a source pack is determined based on the PC0 value (step 104). If it is not a source pack, additional information processing is performed for the channel (M-channel) (step 105).

If it is a source pack, whether its additional flag AF is 1 or 0 is checked (step 106). If the additional flag is 1, the channel number M, and T.P. No. indicated as N, the total number of additional packs, is read (step 107) to check if the N value is 0 (step 108). If N of T.P. No. which is the total number of the additional pack is 0, it is identified that the source pack is the last one as marked 45 in FIG. 5 (step 109). If N value is not 0, it is determined that the source pack is the first one in multi-channel recording. N packs after this are identified as additional source packs (step 110).

If the additional flag AF is identified to be 0 in step 106, whether or not N of T.P. No., the total number of additional packs is 0 is checked (step 111). If N of T.P. No., the total number of additional packs is 0, it is determined that the source pack is one in a single channel (step 112). If N is not 0, it is determined that the source pack is one of additional source packs in multi-channel recording (step 113).

If the pack is identified as a text-related pack in step 103, whether or not it is a text header is checked referring to PC0 value (step 114). If the pack is not a text header, it is identified as text data (step 115). The program number and the index number (hereafter referred to as P/I) are identified as, for example, the program number M and the index number M (hereafter referred to as Mp/Mi) based on P/I of the previous text header.

On the other hand, if the pack is a text header, the P/I data, for example, are read from the pack as Mp/Mi while TNO, the total number of text data is read as N (step 116). Then, whether or not the above read P/I shows a specific value (EE in hexadecimal nomination) is checked (step 117). If P/I is not the specific value, pack N appended to the pack is identified as the Mp/Mi text data group as marked 52 in FIG. 7 (step 118).

If P/I shows the specific value, N packs appended to the pack are identified as text data packs having the same P/I as the pack before the text header (step 119). Therefore, N packs appended to the pack constitute a text group together with the text data before the packs as shown in FIG. 8.

The value for the flag AF, T.P. No., the total number and their interpretation described above are only an example and these, of course, do not limit the present invention. Also, each of the packs described above can be recorded within the subcode region only or the main data regions only. Moreover, example of recording main data or packs onto a magnetic tape are described in the aforementioned embodiment; however, other recording media such as a laser disk, etc. are also applicable.

As described above, according to the present invention, a flag tells whether additional information is constructed with a plurality of packs or is a single pack. The number of packs tells how many packs of additional information exist. In addition, according to the present invention, the reader can tell whether the main data are recorded on a single channel or multi-channels and have a reader recognize the channel number. The channel mode, in which the main data are recorded, a single-channel or multi-channel, is clear, unlike the conventional technology, which can cause confusion. The channel number can be recorded. This is especially effective in recording time-division multiplexed digital broadcasts over the same bandwidth.

Also, according to the present invention, additional information packs of the identical fixed data length other than the program information and title can be recorded. This allows a variety of additional information to be recorded. The pack-based configuration significantly eliminates wasting the memory capacity of a recording medium when recording additional information.

In addition, according to the present invention, the flag and number tell the number of information packs to be multiplexed appended to the source pack. The present channel-related information can correspond to the sequentially recorded information, if read sequentially. In this way, not only the channel information but also the contents recorded on each of the channels can be clearly recognized by the reader.

Moreover, according to the present invention, the end of the packs appended to the source pack can be identified by the flag and the number of the source packs. Therefore, even if additional packs are damaged and the number of appended packs is unknown, the end of the additional packs can be positively confirmed.

Furthermore, according to the present invention, the positions of the packs appended to the source pack to be multiplexed can be determined by a flag and number. This allows the important packs to be copied a plurality of times to secure reliability to an improved degree.

According to the present invention, text data can be recorded in the pack-based configuration using text data packs appended to the text header. When the additional information of the text header is at the predetermined value, by indicating that the text data pack appended to the text header has the identical program number as the text data packs multiplexed before the text header, any arbitrary number of the text data packs can be multiplexed. This allows recording a large amount of data which takes a large memory capacity.

Various modifications will become possible for those skilled in the art after receiving the teachings of the present disclosure without departing from the scope thereof.

What is claimed is:

1. A method of recording digital signals on a recording medium comprising the steps of:

recording main data on said recording medium on a data block basis, said data block having a preselected length;

recording auxiliary information on said recording medium on a data pack basis, said data pack having a length shorter than said preselected length of said data block; and recording as a form of source packs, multiplexed with said auxiliary information, a fixed pattern indicating the type of said data packs, a flag indicating whether said auxiliary information comprises a plurality of data packs in which additional information pack exists, or a single data pack in which no additional information pack exists, and a number associated with said flag, whereby when said flag indicates said auxiliary information comprises a plurality of data packs, said number indicates the total number of said additional information pack, and when said flag indicates said auxiliary information comprises a single data pack, said number indicates said additional information pack number.

2. A method, as claimed in claim 1, wherein said data packs are information packs which contain only said fixed pattern and said auxiliary information without having said flag or said number.

3. A method, as claimed in claim 1, wherein said data packs are information packs and said flag and number identify only the number of information packs containing said fixed pattern and said auxiliary information which are multiplexed with said source packs.

4. A method, as claimed in claim 1, wherein said flag and the number of said source packs identify the last pack of a data pack group with which said source packs are multiplexed.

5. A method, as claimed in claim 1, wherein said flag and the number of said source packs identify the location of said data packs in the pack group with which said source packs are multiplexed.

6. A method of recording digital signals on a recording medium comprising the steps of:

recording main data on said recording medium on a data block basis, said data block having a preselected length;

recording auxiliary information on said recording medium on a data pack basis, said data pack having a length shorter than said preselected length of said data block; and recording as a form comprising text header pack and text data pack, multiplexed with said auxiliary information, a fixed pattern indicating the type of said data packs, a text code of the text header pack of said auxiliary information, a total number indicating the total number of text data packs appended to said text header pack, and a pack number indicating the number of text data pack appended to said text header pack, wherein when said auxiliary information of said text header pack is a specific value, said text header pack indicates that said text data packs before and after said text header pack have an identical program number.

7. A recording medium for recording digital signals comprising:

main data recorded on said recording medium on a data block basis, said data block having a preselected length;

auxiliary information recorded on said recording medium on a data pack basis, said data pack having a length shorter than said preselected length of said data block; and including a fixed pattern indicating the type of said data packs, a flag indicating whether said auxiliary information comprises a plurality of data packs in which additional information pack exists, or a single data pack in which no additional information pack exists, and a number associated with said flag, whereby when said flag indicates said auxiliary information comprises a plurality of data packs, said number indicates the total number of said additional information pack and when said flag indicates said auxiliary information comprises a single data pack, said number indicates said additional information pack number, recorded as a form of source packs multiplexed with said auxiliary information, said source packs being recorded on either a predetermined specific region of said data blocks or a specific location within said data blocks or being recorded on both.

8. A recording medium, as claimed in claim 7, wherein said data packs are information packs which contain only said fixed pattern and said auxiliary information without said flag and said number.

9. A recording medium, as claimed in claim 7, wherein said data packs are information packs and said flag and number identify the number of said information packs which are multiplexed with said source packs.

10. A recording medium for recording digital signals comprising:

main data recorded on said recording medium on a data block basis, said data block having a preselected length;

auxiliary information recorded on said recording medium on a data pack basis, said data pack having a length shorter than said preselected length of said data block, and including a fixed pattern indicating the type of said data packs, a text code of the text header pack of said auxiliary information, and a total number indicating the total number of text data packs appended to said text header pack, and a pack number indicating the number of text data pack appended to said text header pack, recorded as a form comprising text header pack and text-data pack multiplexed with said auxiliary information, said text header and text data packs being recorded on either a predetermined specific region or a specific location within said data blocks or on both, wherein when said auxiliary information of said text header pack is a specific value, said text header pack indicates that said text data packs before and after said text header pack have an identical program number.

11. An apparatus for recording digital signals on a recording medium comprising:

means for recording main data on said recording medium on a data block basis, said data block having a preselected length;

means for recording auxiliary information on said recording medium on a data pack basis, said data pack having a length shorter than said preselected length of said data block; and means for recording as a form of source packs, multiplexed with said auxiliary information, a fixed pattern indicating the type of said data packs, a flag indicating whether said auxiliary information comprises a plurality of data packs in which additional information pack exists, or a single data pack in which no additional information pack exists, and a number associated with said flag, whereby when said flag indicates said auxiliary information comprises a plurality of data packs, said number indicates the total number of said additional information pack, and when said flag indicates said auxiliary information comprises a single data pack, said number indicates said additional information pack number.

12. An apparatus for recording digital signals on a recording medium comprising:

means for recording main data on said recording medium on a data block basis, said data block having a preselected length;

means for recording auxiliary information on said recording medium on a data pack basis, said data pack having a length shorter than said preselected length of said data block; and means for recording as a form comprising text header pack and text data pack, multiplexed with said auxiliary information, a fixed pattern indicating the type of said data packs, a text code of the text header pack of said auxiliary information, and a total number indicating the total number of text data packs appended to said text header pack, and a pack number indicating the number of text data pack appended to said text header pack, wherein when said auxiliary information of said text header pack is a specific value, said text header pack indicates that said text data packs before and after said text header pack have an identical program number.

13. A method of reproducing digital signals recorded on a recording medium, said recording medium having main data recorded on a data block basis, said data block having a preselected length, said recording medium having auxiliary information recorded on a data pack basis, said data pack having a length shorter than said preselected length of said data block, the method comprising the steps of:

reproducing a fixed pattern indicating the type of said data packs, the fixed pattern recorded multiplexed with said auxiliary information;

reproducing a flag indicating whether said auxiliary information comprises a plurality of data packs in which additional information pack exists, or a single data pack in which no additional information pack exists, the flag recorded multiplexed with said auxiliary information;

reproducing a number associated with said flag, whereby when said flag indicates said auxiliary information comprises a plurality of data packs, said number indicates the total number of said additional information pack, and when said flag indicates said auxiliary information comprises a single data pack said number indicates said additional information pack number, the number recorded multiplexed with said auxiliary information;

determining the type of the data pack based on said fixed pattern;

determining whether said auxiliary information comprises a plurality of data packs or a single data pack based on said flag; and reading said number, and determining the total number of said additional information pack or said additional information pack number.

14. A method of reproducing digital signals recorded on a recording medium, said recording medium having main data recorded on a data block basis, said data block having a preselected length, said recording medium having auxiliary information recorded on a data pack basis, said data pack having a length shorter than said preselected length of said data block, the method comprising the steps of:

reproducing a fixed pattern indicating the type of said data packs, the fixed pattern recorded multiplexed with said auxiliary information;

reproducing a text code of the text header pack of said auxiliary information, the text code recorded multiplexed with said auxiliary information;

reproducing a total number indicating the total number of text data packs appended to said text header pack;

reproducing a pack number indicating the number of text data pack appended to said text header pack;

determining the type of said data packs based on said fixed pattern;

reading the text code;

reading said total number, and determining the total number of text data packs appended to said text header pack;

reading said pack number, and determining the number of text data pack appended to said text header pack;

determining, when the pack is said text header pack, whether said information of said text header pack is a specific value or not; and determining, when said auxiliary information of said text header pack is a specific value, said text header pack indicates that said text data packs before and after said text header pack have an identical program number.

* * * * *